Figure 1:
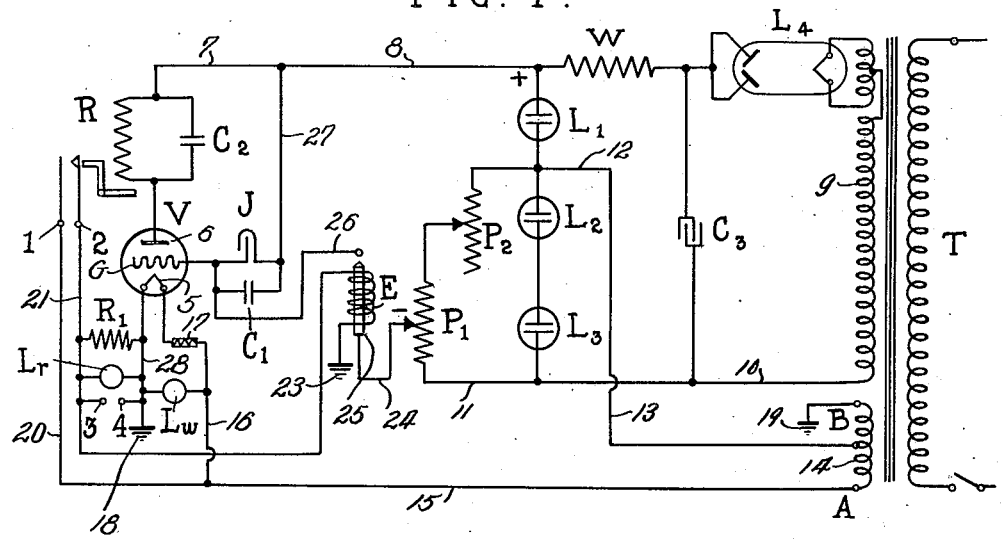

May 18, 1937. S. STRAUSS 2,081,074
CONNECTION USED IN PROCEEDINGS FOR MEASURING VERY HIGH RESISTANCES
Filed Dec. 7, 1931

Inventor
SIEGMUND STRAUSS,
By H. H. Snelling
Attorney

Patented May 18, 1937

2,081,074

UNITED STATES PATENT OFFICE 2,081,074

CONNECTION USED IN PROCEEDINGS FOR MEASURING VERY HIGH RESISTANCES

Siegmund Strauss, Vienna, Austria

Application December 7, 1931, Serial No. 579,708
In Germany November 7, 1931

16 Claims. (Cl. 250—34)

This invention relates to systems for measuring very high resistances and has for its object the stabilization and general improvement of a system of the type described in United States Patent 1,649,753; this is a continuation in part of my application, Serial No. 541,936, filed May 18, 1931.

In said United States patent, which corresponds to the German Patent 371,061, the system described briefly consists of two coupled circuits, namely, a main circuit including a source of E. M. F., the primary of a transformer and a thermionic valve for starting and stopping the flow of current in said circuit; and a control circuit which includes the grid of said valve, a control condenser connected to said grid, the secondary of said transformer—and that part of the main circuit containing the source of E. M. F. and the plate of said valve. The resistance to be measured is shown in the patent as connected across the terminals of the condenser thus serving as a leakage path for the condenser charges caused by negative current-blocking charges built up on the grid by current flowing from one electrode of the valve to the other. As described in the patent, a blocking charge on the grid reduces and finally stops the current flow in the main circuit but due to the leakage thru the high resistance the blocking charge on the grid almost immediately dies down allowing the main current to flow again until the blocking charge again reaches a current blocking value when the current again is stopped which continued building up and dying down produces a pulse or beat in the main circuit and this cycle is repeated as long as desired. The transformer coupling speeds up the opening and closing action of the valve by charging the grid and the condenser thus making the resistance of the leakage path the main time consuming factor of the system and rendering other factors negligible. As explained in the patent, the value of the high resistance will govern the rate of leakage which in turn determines the number of beats or pulsations of current in the main circuit for any given period of time. Thus, by placing an indicating device in the main circuit the current impulses can be counted and thereby one may accurately determine the value of any high resistance such for example, as that of ionization chambers used in measuring the hardness or intensity of Roentgen rays. As is well known, the resistance of an ionization chamber or photo-electric cell exposed to such rays varies with the hardness or with the intensity of the ray and my system is found to be ideal for directly observing and controlling such hardness or intensity variations because the indicator shows at once any change in the rate of the pulsations which change being interpreted as a change in hardness or intensity of the ray is a reliable guide to the operator in control of the Roentgen ray machine.

In the system described the source of E. M. F. used in the main circuit consisted of a dry cell or other type of storage battery which has the drawback that the voltage does not remain constant over a very long period of time with the result that it was necessary to include a correction factor taken from the voltage readings in order to calculate any resistance being measured, i. e., ionization chamber measurements, for example, could not be taken directly. It is therefore a primary object of this invention to provide means whereby the tension required for the periodical impression of a blocking charge on the control grid is more reliably constant during a given test or series of tests and in which the blocking voltage is not affected by load fluctuations on the supply and for this reason in this invention the tension is taken from the tension of a gaseous conductor lamp connected to the supply instead of from the anode or "B" battery as formerly done. It is a further object to arrange circuits whereby the tension of a gaseous conduction lamp is substituted also for the anode battery so that a more reliable and constant source is provided for creating a current thru the valve in the so-called main circuit. A still further object relates specifically to the use of an ionization chamber in measuring Roentgen rays or the like and this object is to provide means for saturating the ionization chamber in which means the superimposition tension required for attaining the saturation current is also taken from a gaseous conduction lamp the voltage of which entirely or partially coincides with the new anode tension.

In carrying out the objects just mentioned it is a further feature of this invention that the intensity of the anode—saturation—and blocking tension required is arbitrarily determined by directly connecting in series a number of gaseous conduction lamp sections in which the lamps employed are preferably not provided with the protective resistances usually mounted in the bases or sockets and which also may be designed for different starting voltages.

It will be observed in considering the objects just set forth that the main and control circuits described in my patent are in this invention substantially divorced from each other whereby certain properties of the main circuit have only a negligible effect on the action of the control circuit to which is connected the resistance being measured. In carrying out this separation of circuits there is provided a relay having an actuating coil in the main circuit which relay closes contacts to complete a connection between the new source of E. M. F. and the grid. It is an object of this invention to provide a retarded relay whereby when the current in the anode circuit is stopped the contacts will not open before the secondary appliances and apparatus such as a time switch, dosimeter, electric stop watches, automatic cut-off relays for the Roentgen installation and the like have had time to operate.

A further object of the present invention is the provision of a buffer condenser connected across the blocking-charge supplying section of the gaseous conduction lamp path thereby rendering the lamp path free from voltage fluctuations in the input circuits as well as in the output circuits of said lamp path or portions thereof.

A still further object of this invention is the grounding of my system at a single point so selected as to make the anode voltage and saturation voltage equal.

Figure 2:
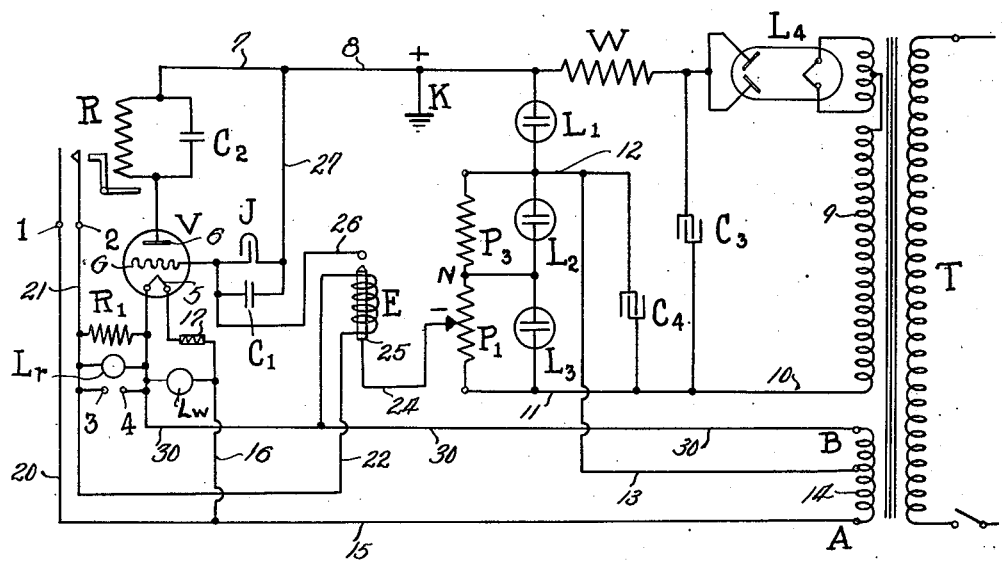

The above and further objects of this invention will be better understood by a consideration of the following detailed description taken with the attached drawing in which Figure 1 is a diagrammatic showing of my improved system and Figure 2 is a modification.

In the embodiment of the invention shown in Figure 1 the amplifier valve V controls the operation of the anode relay R in much the same way as the valve in the above mentioned German patent operates the relay in the anode circuit, and this relay R in effect takes the place of the transformer shown in the United States patent. The anode current source is represented by the gaseous conduction lamp $L_1$, which may consist of one or more units of a bank of such lamps connected across the terminals of an A. C. rectifier set.

The armature of the relay R is adapted to operate the contacts 1 and 2 so that the secondary winding A—B of the transformer T in the main set will be connected to the clock relay $R_1$, the pilot lamp $L_r$, the coil of the relay E and secondary apparatus that may be connected to the binding posts 3 and 4.

The main or rectifier set, which is conventionally represented as consisting of the transformer T, the usual rectifying valve $L_4$ and the damping (attenuation) condenser $C_3$, contains in addition not only the alternating current protective resistance W and the gaseous conduction lamp (gaseous path) $L_1$ but also the gaseous conduction lamps $L_2$ and $L_3$ so that the charge of the condenser $C_1$ required for operating a given installation, may be brought to the necessary voltage, by manipulation of the potentiometers $P_1$ and $P_2$.

The leakage path for discharging the condenser C, is shown as an ionization chamber J which may be a photo-electric cell, radium, uranium preparation and the like. It will be seen that the resistance of this cell J will directly control the rate of discharge of the condenser and it follows that the control of this resistance by exposing the cell to light, Roentgen or other rays will regulate the discharge of the condenser. As soon as the condenser $C_1$ has become so far discharged under the influence of the Roentgen radiation in the ionization chamber J, that an anode current is produced in the valve V causing the energization of the relay R which closes contacts 1 and 2 and thus operates the small electromagnet E, whereby the blocking tension (voltage) obtained from the gaseous-conduction lamp batteries $L_2$, and $L_3$ is, for a short time, imposed on the grid condenser $C_1$, the ionization chamber J and the grid. In this manner the highly insulated grid condenser $C_1$ is again charged up to its original voltage which, being strongly negative, imposes a negative or current blocking charge on the grid G, thus effectively stopping the flow of current thru the main or anode circuit, with the result that the relay R allows the contacts 1 and 2 to open which in turn opens the contacts of the relay E. The grid condenser $C_1$ begins to discharge the moment the last mentioned contacts open and thus the cycle repeats itself as described for as long as is required to measure a resistance or to regulate the hardness of the Roentgen ray.

According to this invention it is desirable that a time lag be provided between the stopping of the anode current and the opening of contacts 1 and 2 in order that sufficient time be had for the correct operation of the secondary apparatus connected to the terminals 3 and 4; this apparatus for example, may consist of a dosimeter, electric stop watch, automatic cutout or the like. This aim may, for instance, be attained by connecting a condenser $C_2$ in parallel with the coil of the anode relay R which expedient prevents the armature from dropping prematurely at the instant the blocking process is terminated. But the connection may also be so arranged that the electromagnet used for controlling the dosimeter will close the circuit of the solenoid E after the termination of the stroke.

With the switching in series of the gaseous-conduction lamp sections e. g., $L_1$, $L_2$, $L_3$ not only do the anode and saturation voltages remain practically unaltered, but also, notwithstanding the fluctuations of the voltage of the supply mains, the intensity of the blocking tension remains at its adjusted value. A considerable simplification of the connections and the construction of the measuring apparatus over that described in my prior patents is also attained by means of the above arrangement.

Except for the elimination of the protective resistances and the commutation of the tension, the present simplified proceeding for measuring very high resistances operates in much the same manner as the system described in the U. S. Patent 1,649,753 as modified by the German addition patent cited above. The main set is designed in the usual manner and contains, e. g., the rectifying valve $L_4$ which may also be supplanted by a dry rectifier; but does away with the smoothing circuits employed in other apparatus.

By means of this invention the measuring connections proper and the main set itself are substantially simplified, while at the same time an effective and simple compensation of the fluctuations of the voltage of the supply mains is provided, and the measurements given are substantially more accurate than with any other known arrangement.

The embodiment of my invention shown in Figure 2 differs from that in Figure 1 in that a single earth potential for a certain voltage point is chosen for all voltages acting on the system. Considering the fact that the lining of the outer walls of the ionization chamber, owing to a complete saturation of the streams of ions, are preferably brought to higher positive potential, it is best to use the potential of the anode voltage for this purpose. According to the modification of this invention shown in Figure 2, this potential is connected to the earth at K. This arrangement not only functions to saturate the ion stream but acts at the same time to keep all outer high frequency fields from penetrating through the chamber walls into the chamber, which fields would otherwise effect the resistance of the chamber and thereby influence the grid-output, disturbing the exact indication of the instrument. As thus grounded the outer chamber wall is not only a conductive surface of the chamber but at the same time is a reliably acting Faraday cage or shield against the influences causing the above mentioned disturbances. Furthermore, according to this invention, this voltage is not only connected to the earth but at the same time acts as a stabilizing capacity to all metal parts of the device. To accomplish this the usual arrangement consisting in earthing all valve connections of the filament circuit has been abandoned in this modification.

A further difference in Figure 2 resides in the addition of the condenser $C_4$ which is in parallel with that part of the gaseous conduction lamp path, which supplies the charging tension of the grid control condenser $C_1$. Even though a well dimensioned filter chain be provided, the current consumption of auxiliary apparatus will, particularly in case of relatively heavy loads or charges being imposed suddenly on the device, cause a small voltage drop in the transformer connected to the public supply, the result being that the current intensity of the gaseous conduction lamps will drop slightly in case of the measuring devices being charged. This sudden drop sets up induction tensions in the choke of the filter circuit, which tensions are equalized over the path of the gaseous conduction lamp, thereby altering the tension which otherwise would be constant. According to the present invention the additional condenser $C_4$ acts like a buffer battery to perfectly equalize these short fluctuations, so that disturbances are reliably eliminated in this manner.

In order to clarify the operation of the system the anode circuit and blocking circuits particularly in Figure 2, may be traced as follows:—
Beginning at the cathode 5 of the valve V the anode current may be assumed to flow thru the grid G to anode 6, thru relay R, conductors 7 and 8, to one side of lamp $L_1$, which is the source of the anode current. From the other side of lamp $L_1$ the current flows thru conductors 12 and 13 to the center of the secondary or heating coil A—B of the transformer T where the current splits, one portion traveling thru conductors 15 and 16, thru 17 and to the cathode 5 and the other portion traveling thru conductors 30 to the cathode 5, thus completing the anode or main circuit.

The flow of current in the circuit just described energizes the relay R causing it to close contacts 1 and 2 included in a branch connected across the cathode heating circuit, which branch also includes the conductors 20, 21 and 22 and the coil E of the relay; note that the clock relay $R_1$, the pilot lamp $L_r$ and the secondary apparatus (assumed to be connected at contacts 3—4) are also branches connected across the cathode heating circuit in parallel with the branch containing coil E. Beginning at the cathode 5 the heating circuit consists of the device 17, conductors 16 and 15, coil 14 of the secondary A—B and conductor 30; it will be apparent that current flows in this circuit as long as the transformer T is energized.

Ignoring for a moment, the cathode 5, relay $R_1$, and the pilot lamp $L_r$, we may consider the closing of the contacts 1—2 as completing the control circuit thru the coil E and source A—B. Energization of coil E closes the charging or current blocking circuit which may be traced thus, beginning at the slider on potentiometer P, the charge flows thru conductor 24, armature 25, conductor 26, to the grid G and also to the condenser $C_1$ and cell J. The other side of the condenser $C_1$ and cell J and the anode 6 is connected by way of conductors 7 and 8 and lamp $L_1$ to one side of the lamp bank comprising lamps $L_2$ and $L_3$, the other side of this bank being connected to the lower side of the potentiometer $P_1$. It will be seen that the lamps $L_2$ and $L_3$ constitute the source of the blocking voltage which voltage may be precisely adjusted to accommodate the setting of the dosimeter by manipulation of the potentiometer $P_1$. The values of resistance $P_3$ and condenser $C_4$ are chosen to best hold any selected blocking voltage at a constant value.

Although I have described my resistance measuring device as used in connection with the observation of the effects of Roentgen rays on ionization chamber resistances or the like, it is to be understood that it may be used for measuring all kinds of high resistances.

Having now particularly described and ascertained the nature of my said invention and in what manner the same is to be performed I declare that what I claim is:

1. The device of claim 5 in which the current source of said main-circuit includes a rectifier and filter for obtaining a charging current from alternating current mains, a series of glow discharge tubes connected across the filter for obtaining a source of constant voltage from said rectifier, a resistor connected across a chosen number of said tubes, a conductor connecting one side of the filter to the anode, a second conductor for connecting a chosen point in the resistor to said ionization chamber and a buffer condenser connected across said chosen number of glow discharge tubes whereby to eliminate disturbances due to variations in the current flowing through the glow tubes, said first mentioned conductor being grounded.

2. In a system for measuring the hardness of Roentgen rays, a main circuit including a source of E. M. F. and a valve for controlling the flow of current in said circuit, means associated with said circuit and responsive to said flow of current therein for creating a current stopping condition in said valve, said means including a condenser for maintaining said condition, a leakage path around said condenser for allowing said condition to die out and thereby open the valve to permit the flow of current to begin again, said leakage path comprising a resistance means which when exposed to Roentgen rays varies with the hardness or intensity of the rays, said resistance means being sensitive to stray fields set up by high tension machines and the like, and means for shielding said resistance means from said stray fields, said shielding means being grounded, and indicator means connected to the first mentioned means and therefore responsive to flow of current in the main circuit for observing the effect of the variation of the hardness of the ray on the resistance means.

3. The device of claim 2 in which the resistance means comprises an ionization chamber and said shielding means consists of an outer conductive lining connected to the ground.

4. The device of claim 2 in which the resistance means comprises an ionization chamber and said shielding means consists of an outer metal lining connected to the ground and in which said source of E. M. F. is of sufficiently high value to saturate the chamber.

5. Apparatus for measuring ionization currents and the like comprising an ionization chamber having an outer lining, a main circuit including a source of high potential and including a thermionic valve having an anode, a cathode and a grid, a condenser connected to the grid and to said source and said anode whereby to impress its charge on the grid to control the flow of current thru the valve, means connecting said chamber across the condenser to provide a path for discharging the grid thereby operating said valve to affect the current flow in said main circuit, a normally open circuit including said condenser and part of said potential source whereby when closed a charge is impressed on said condenser, means associated with said main circuit and operative in response to current flow therein to close said normally open circuit thereby to charge the condenser and operate said valve to affect the current flow, a measuring device operatively associated with one of said circuits for counting the current impulses in the main circuit caused by the operation of said valve, said outer lining being connected to said source of high potential whereby a high voltage is impressed on the lining to substantially saturate the chamber thus rendering the resistance of the chamber immune to stray fields.

6. The device of claim 5 in which the outer lining and the anode have a common ground so that said high voltage is substantially equal to the anode tension.

7. The device of claim 5 in which the current source of said main circuit includes a rectifier and filter for obtaining a charging current from alternating current mains, a series of glow discharge tubes connected across the filter terminals for obtaining multiple sources of constant but different voltages from said rectifier, a resistor connected across a chosen number of said tubes, a conductor connecting one side of the filter to the anode and constituting part of said main circuit, a second conductor for connecting a chosen point in the resistor to said ionization chamber and forming part of said normally open circuit, and a buffer condenser connected across said chosen number of glow discharge tubes whereby to eliminate disturbances due to variations in the current flowing thru the glow tubes.

8. In a system for measuring a high resistance, comprising a first circuit including a thermionic valve having a cathode, an anode and a control grid, the source in said circuit being arranged for impressing a positive potential on the anode, means including a normally open second circuit for impressing a negative potential on the grid, a condenser in said second circuit, a connection between the negative side of said condenser and the grid, means for connecting said high resistance across said condenser, a third circuit including means for closing said second circuit, a relay for causing the energization of said third circuit, the actuating coil of said relay being connected in the first circuit, and a storage condenser connected across said coil and being of sufficient capacity to assure operation of the relay with relatively short current impulses in the first circuit.

9. The apparatus of claim 16 in which a portion of said third circuit includes a conductor connected to one terminal of the condenser and the outer lining of the chamber and to that portion of the first circuit connecting the anode to the source and a ground on said portion whereby the anode voltage is the same as impressed on said lining.

10. A measuring system comprising a first circuit including a valve, said valve having a cathode, anode, and grid, a second circuit including a condenser for impressing a blocking charge on said grid, a third circuit adapted to be closed upon current flow in said first named circuit and when so closed operable to close said second named circuit, means connected with said condenser for dissipating any charge accumulated thereon and measuring apparatus operatively associated with said second named circuit, said means comprising an ionization chamber having an outer metal lining connected to said anode, to said second circuit and to the ground whereby the rate of dissipation of any condenser charge is immune to stray fields and the action of said circuits is stabilized.

11. In an apparatus for measuring a high resistance, a circuit including a source of current and a thermionic valve having a plate anode, a control grid and a cathode, a condenser connected to the grid and to a point in said circuit between the source and the anode, means for connecting an ionization chamber the resistance of which is to be measured in parallel with said condenser, means responsive to flow of current in said circuit for applying a blocking voltage to the grid to stop said current flow, said voltage impressing a charge on said condenser which charge tends to leak thru said chamber at a rate depending on the resistance of the chamber, and means for grounding one side of said chamber whereby the earth acts as a stabilizing capacity and outer high frequency fields are prevented from affecting the resistance of the leakage path.

12. A system for measuring high resistances comprising a vacuum tube including a source of electrons, a control electrode and an anode, means for energizing said elements of the vacuum tube with direct current from a source of alternating current, said means including a rectifier and smoothing means for the proper energization of the control electrode and the anode, said smoothing means including a condenser, glow tubes and a resistance, said tubes being connected in series across the terminals of said rectifier, said condenser being connected in parallel with the tubes and said resistance being connected in series with the rectifier and tubes, said first mentioned means including a conductor for supplying a positive potential from the glow tubes to the anode, a second conductor for supplying a negative potential from the glow tubes to the control electrode, the high resistance which is to be measured being connected across said first and second conductors, a condenser connected in parallel to said high resistances, a switch connected in series with said second conductor, a relay having its operating coil connected in series with the first conductor, said relay having connections including a source of current for operating said switch whereby a current in the anode circuit will close the said switch and thus energize the control electrode with a negative potential, thereby to stop the flow of said current in the anode circuit, and indicator means connected to be operated by said relay.

13. In a system for measuring high resistances comprising a rectifier unit for connection to commercial supply lines of alternating current for obtaining a source of direct current, said rectifier unit including means for smoothing out the ripples in the direct current, gaseous conduction lamp means connected across the output terminals of said rectifier unit whereby to further smooth out irregularities in the direct current and to provide a plurality of sources of stable potential, a main circuit including a portion of said gaseous conduction lamp means as a source of unidirectional E. M. F., said circuit including a thermionic valve having an anode, a cathode and a control grid, a relay coil connected in said circuit whereby a flow of current through said circuit energizes said relay coil, a switch adapted to be operated by said relay coil, a second circuit including the contacts of said switch, a relay coil in the second circuit, a normally open circuit connected to a negative terminal of the gaseous conduction lamp means and adapted to be closed by energization of the last mentioned relay coil, said open circuit being connected to the control grid of said valve whereby upon being closed it impresses a blocking charge on the grid thereby stopping the flow of current in said main circuit, a condenser in said normally open circuit and connected to said control grid thereby tending to maintain the blocking charge on said control grid, and means for connecting the resistance to be measured across the condenser.

14. The device of claim 13 in which the positive terminal of the lamp path is grounded, said terminal being the only grounded point in the system.

15. A measuring system comprising a first circuit including a valve, a normally open second circuit including means for closing said valve to stop the flow of current in the first circuit, a condenser connected to said means and to the first circuit, a third circuit coupled with the first and second circuits, means in the first circuit responsive to flow of current therein for causing current to flow in the third circuit, means in the third circuit responsive to current flow therein to cause closing of the second circuit to place a charge on said condenser thereby to actuate said valve closing means, said charge tending to maintain the valve closing condition, ray responsive means connected in parallel with the condenser and acting as a leakage path to dissipate said condenser charge at a rate dependent on the nature of the ray and means for rendering said ray responsive means immune to stray fields whereby the rate of charge dissipation and therefore the duration of time the valve remains closed is dependent solely on the nature of the ray acting on the ray responsive means.

16. In an apparatus for measuring Roentgen rays and the like comprising a first circuit having connected therein a relay coil and thermionic valve having an anode, a grid and a cathode, a second circuit having connected therein contacts adapted to be operated by said relay coil and also having connected therein the coil of a second relay; a third circuit including a condenser and contacts adapted to be operated by the coil of said second relay, an ionization chamber adapted to be exposed to Roentgen rays to be measured and connected in parallel with said condenser and providing a leakage path for discharging the condenser at a rate varying with the quality of the ray being measured, said chamber having an outer conductive lining, a connection between the negative side of said condenser and said grid whereby the grid and thereby the valve are controlled by the charge on the condenser, the source of E. M. F. included in the first circuit being of relatively high value for applying for desired measuring intervals a high voltage between said anode and cathode, and means including part of the first circuit for applying at the same time an equal voltage between the outer lining of said chamber and its opposite terminal to completely saturate the chamber thereby rendering the chamber substantially immune to all influences except the Roentgen rays being measured.

SIEGMUND STRAUSS.